United States Patent

[11] 3,602,195

| [72] | Inventor | Ronald S. Blough<br>Fairfield, Iowa |
|------|----------|-------------------------------------|
| [21] | Appl. No. | 846,389 |
| [22] | Filed | July 31, 1969 |
| [45] | Patented | Aug. 31, 1971 |
| [73] | Assignee | Fairfield Engineering and Manufacturing Co.<br>Fairfield, Iowa |

[54] WEANING DEVICE
5 Claims, 3 Drawing Figs.

[52] U.S. Cl. ................................................ 119/18, 119/29, 119/51
[51] Int. Cl. ........................................... A01k 15/00, A01k 01/00, A01k 05/00
[50] Field of Search ............................... 119/29, 17, 18, 20, 51, 53.5, 54, 15, 51.12, 98

[56] References Cited

UNITED STATES PATENTS

| 2,234,112 | 3/1941 | Emrick | 119/53.5 |
| 2,271,450 | 1/1942 | Aleshire | 119/54 |
| 2,661,800 | 12/1953 | Reichenbach | 119/51.12 X |
| 2,687,114 | 8/1954 | Tuddenham | 119/54 |
| 2,703,570 | 3/1955 | Young, Jr. | 128/1 |
| 2,737,153 | 3/1956 | Dupont et al. | 119/98 X |
| 2,881,733 | 4/1959 | Young, Jr. et al. | 119/15 |
| 2,997,022 | 8/1961 | Kay | 119/18 X |
| 3,040,707 | 6/1962 | Shrimplin | 119/53.5 |
| 3,126,866 | 3/1964 | Kubota | 119/54 X |
| 3,279,433 | 10/1966 | Biehl | 119/51 |
| 3,473,515 | 10/1969 | Atchinson, Sr. | 119/54 |
| 3,509,854 | 5/1970 | Osbahr | 119/20 |

FOREIGN PATENTS

| 86,169 | 12/1958 | Denmark | 119/20 |

Primary Examiner—Aldrich F. Medbery
Attorney—Wolfe, Hubbard, Leydig, Voit & Osann, Ltd.

ABSTRACT: A device adapted for weaning baby pigs in which a feeder bin and trough are place at the end of a plurality of individual cages in which each baby pig is placed. The internal height and width of the cages are insufficient to allow the animal to turn around, and a resiliently mounted guide member forming part of the feeder bin is sloped downward over the trough so that the animal's reflexive forward movement upon encountering the rear of the cage causes its nose to be directed into the trough.

INVENTOR.
RONALD S. BLOUGH,
BY Wolfe, Hubbard, Voit & Osann
ATTORNEYS.

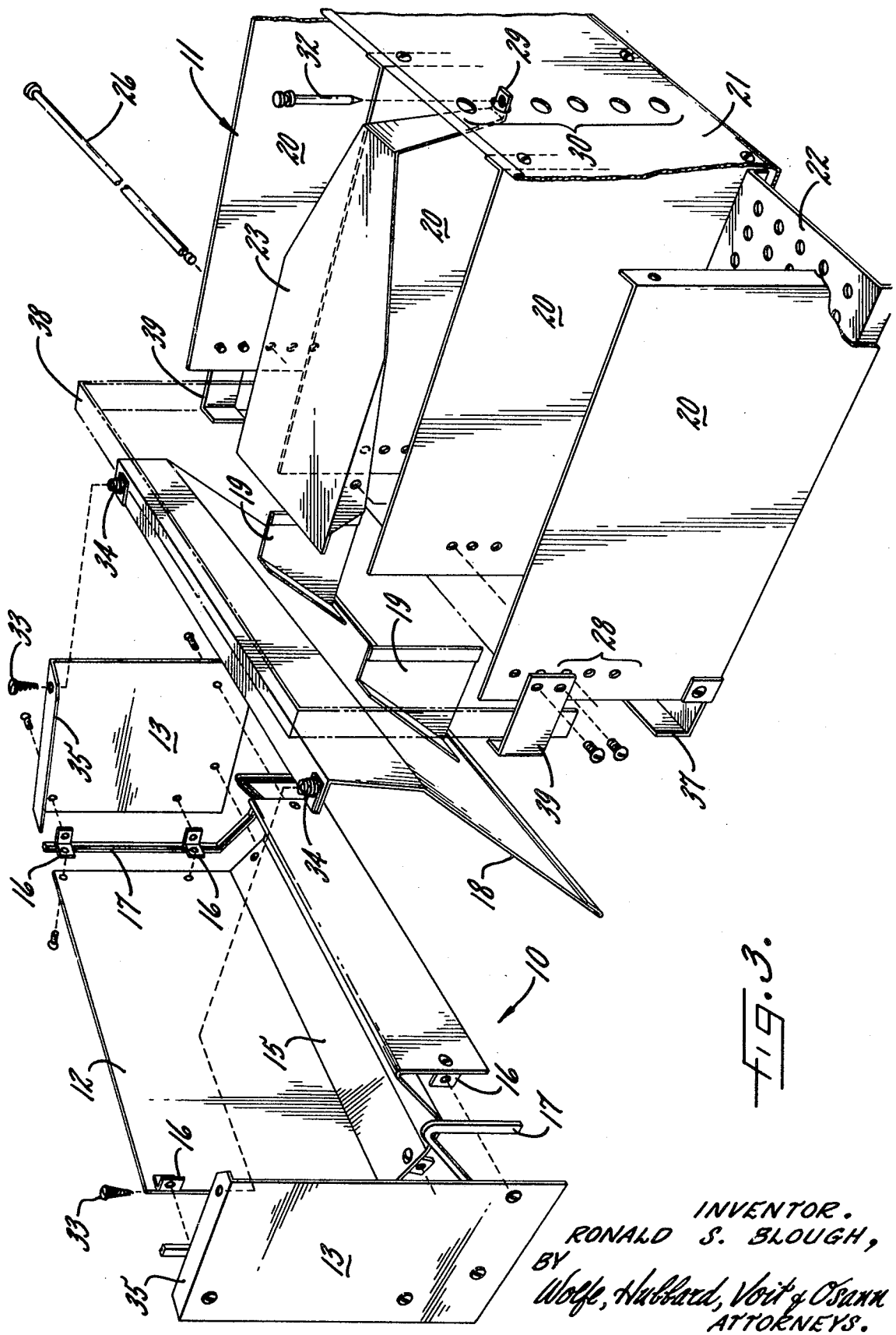

WEANING DEVICE

DESCRIPTION OF THE INVENTION

The present invention relates to weaning devices and in particular to a device for teaching young animals to drink or feed from a trough shortly after birth without further supervision.

It a principal object of the present invention to provide a feeding device for young animals, particularly baby pigs, which will be effective to teach the animals to drink or feed from a trough.

Another object is to provide a weaning device for use with automatic feed dispensing systems in which a young animal may be confined in a manner whereby his attention is continuously directed toward feeding, without other distractions.

A more particular object is to provide a weaning device for baby pigs in which the natural tendency of the pig to move forward upon encountering an obstacle behind is utilized to direct the pig's nose into a trough of feed liquid, thereby accelerating the learning process by which weaning is achieved.

Other objects and advantages of the invention will become apparent upon reading the following detailed description and upon reference to the drawings, in which:

FIGS. 3 is an exploded view of the device of the foregoing figures, illustrating the component parts.

While the invention is described in connection with a particular exemplary embodiment, it will be understood that the invention is not limited to the exact embodiment shown, but is, on the contrary, broadly applicable to all situations in which a young animal must be taught to find food for itself in a trough or other feeding arrangement even though its natural inclination is to seek after its mother for nourishment.

Figure 1:
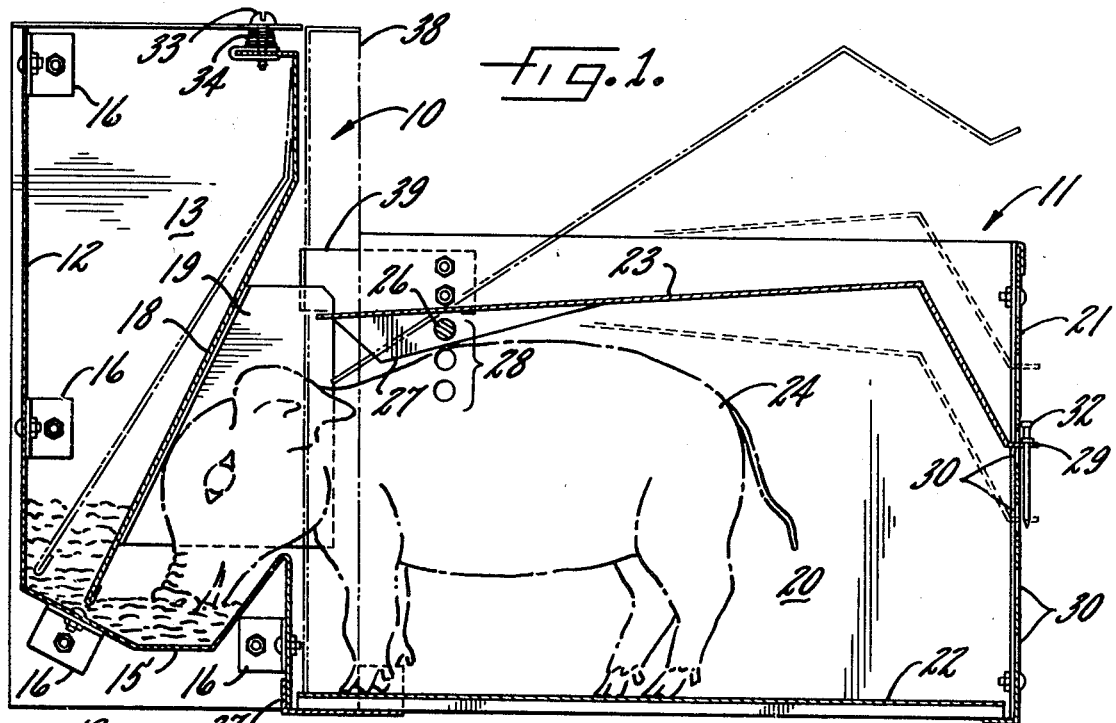
FIG. 1 is a side elevation in section of a weaning device exemplifying the present invention.

There is shown in FIG. 1 an exemplary weaning device consisting of a feeder section 10 and a cage section 11 which is detachably secured to the feeder 10. The feeder 10 is generally of conventional design, comprising a rear wall 12, sidewalls 13, and a trough section 15 formed from an extension of the rear wall 12. These members are secured together by sheet metal clips 16 and screws and nuts or other suitable fasteners with a length of extruded seal material 17 clamped between them.

Forming the front wall of the feeder 10 is a guide member 18 which slopes downward from the cage 11 toward the trough 15 and defines a narrow gap at its lower end for the purpose of controllably dispensing granular feed material from within the bin. The guide member is also provided with abbreviated divider sections 19 which separate the trough 15 into equal sections corresponding to the number of cages 11.

The cage section 11 is preferably constructed in multiple adjacent array as in the illustrative embodiment, but can be constructed as well in individual cage sections. Each cage unit comprises opposed parallel sidewalls 20, and end wall 21 defining one closed end of each cage section 11, a perforated floor 22 (which can alternatively be constructed from expanded metal or wire mesh) and a pivoted lid 23. Opposite the closed end of the cage defined by the end wall 21 is an open end facing the feeder 10.

Figure 2:
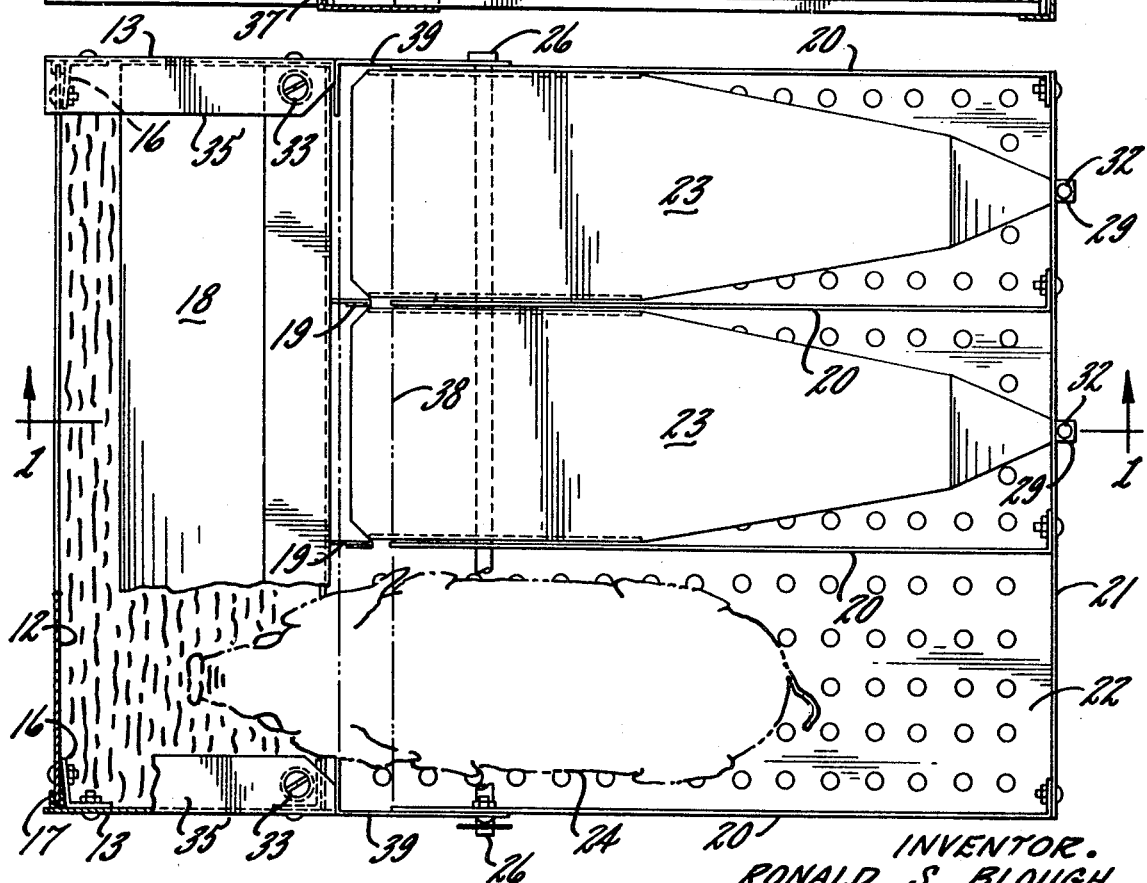
FIG. 2 is a plan view in partial section of the device of FIG. 1.

As a principal feature of the invention, each cage section 11 is constructed with internal height and width dimensions which are insufficient for an animal 24 (shown in phantom lines) to turn around therein, thus causing it to face the trough 15 at all times. For this purpose the cage 11 for each individual animal 24 is designed with an internal width not substantially greater than the width of the animal when lying down in order to allow it to rest, while making it possible for it to reverse itself in the cage. The internal height of the cage sections 11 is dictated by the position of the hinged lid 23 which is positioned to provide a height not substantially greater than the height of the animal 24 when standing on all legs, as shown in FIGS. 1 and 2. In this way the animal 24 cannot rise on its hind legs and by this means reverse itself in the cage 11 while standing upright.

For purposes of adjusting the internal height of the cage, the lid 23 is pivoted on a pivot shaft 26 extending laterally through the adjacent cage sections 11, and engages a downturned flange 27 on each lid 23. Alternatively, the lids can be made of a simple welded wire construction (not shown) having similar means for engaging the pivot shaft 26. Internal height adjustment is provided by a plurality of pivot holes 28 in the side walls 20 through which the pivot shaft 26 may be inserted. At the opposite end of the cage section 11, the lid 23 engages the end wall 21 by means of a tab 29 which protrudes through one of a plurality of openings 30 in the end wall 21. To secure the lid in its intended position, a nail or pin 32 is simply placed through a corresponding hole in the tab 29 of the lid 23.

As a further feature of the invention, means are provided whereby the animal 24 is induced to place its nose in the trough 15 as a result of its normal activity within the cage 11, there by requiring no outside attention in causing it to become acquainted with the feed material or milk substitute in the trough 15. This is achieved by means of the guide member 18, which forms a forward closure for each cage section 11 and because of its downward slope toward the trough 15 from the cage causes the animal's nose to be positionally directed into the trough 15 when the animal moves forward. Such forward movement is a natural reflexive action of an infant animal in its normal activity within the cage 11, as will be further explained herein.

Another feature of the invention is the means whereby the guide member 18 is used to agitate material within the feeder 10 and cause it to fall in controlled amounts into the trough 15, while at the same time providing a shock-absorbing function to prevent surprise and possible injury to the infant animal. This is achieved by yieldably and resiliently mounting the guide member 18 to the feeder 10 by means of screws 33 and conical springs 34 which mount the guide member 18 to overhanging flanges 35 at the top of each sidewall 13 of the feeder 10.

The cage portion 11 is detachably secured to the feeder portion 10 by means of a lateral flange member 37 secured to the floor 22 of the cage sections. The flange 37 terminates in an upraised lip which engages a downturned portion of the panel comprising the rear wall 12 and trough 15 of the feeder 10. The greater weight of the feeder 10, particularly when filled with feed, causes the cage sections 11 to be firmly secured and prevents the feeder 10 and cage 11 from being pushed apart by the animals contained therein.

When it is desired to remove the feeder portion 10 for cleaning or refilling, a cover 38 (FIG. 3, phantom lines) is slipped down over the open ends of the cage sections 11. The cover 38 fits into a channel defined by guide plates 39 secured to the external sidewalls 20. When in place, the cover 38 prevents the animals within the cages 11 from escaping while the feeder section 10 is taken away.

In utilizing the weaning device of the present invention, the young animals are preferably taken from their mother at time sufficiently removed from birth so that the initial flow of mother's milk, which is rich in antibodies, is received and utilized by the young animals. In the case of pigs this antibody-enriched milk is known as colostrum and flows from the sow for a period of about 6 hours after farrowing. It is therefore important that the baby pigs remain with the mother sow for between 6 and 8 hours to receive this milk before weaning.

After removal from the mother sow, each baby pig is placed in an individual cage section of the unit with its nose toward the feed trough. Although the young animal has not yet learned to hold its head down when approaching the trough, its natural tendency to move forward and backward within the confines of the cage will eventually cause it to make contact with the rear of the cage, causing in almost every instance a startled reaction, with the pig running quickly toward the front of the cage 11 and trough 15. Upon encountering the guide member 18 above the feed trough 15, the pig's head is naturally directed downward into the feed trough, where its nose is wetted with a liquid milk replacer. This will occur several more times, and after a sufficient number of cycles the young pig learns that the moist liquid on its nose is food and begins to intentionally place its head down and consume food from the feed trough 15.

It has been learned in practice that baby pigs removed from the mother sow approximately 6 to 8 hours after farrowing and placed in the weaning units will start drinking from the trough after between 5 and 30 minutes from being place in the individual cages 11. They learn to actually drink from the trough 15 in from 1 to 2 hours.

In order to reinforce the learning experience of the baby pigs after they have learned to drink from the feed trough, and to eliminate the distraction caused by the presence of other young pigs, they are preferably left in the individual cages 11 for a period of from 3 to 5 days. At the end of this time they may be released into a common pen where they will play and fight in normal fashion, and then return of their own accord to a conventional feeder when hungry.

I claim as my invention:

1. A device for training an animal to feed from a trough, comprising, in combination, a trough, a cage having a floor, opposed parallel sides, a vertically adjustable a lid, one closed end, an open end facing the trough and a movable guide member forming a closure for the open end of the cage and the side of the trough facing said open end, said cage having internal width dimensions insufficient for the animal to turn around therein when said animal is standing on its front and hind legs, said guide member being sloped downwardly from the cage toward the trough whereby reflexive forward movement by the animal upon encountering the closed end of the cage will direct the animal's nose into the trough, means including said vertically adjustable lid for sizing the cage to an internal height dimension that is insufficient for the animal to turn around therein when said animal attempts to stand only on its hind legs.

2. A device as defined in claim 1 wherein said guide member forms one wall of a downwardly tapered feed dispensing bin, means including said guide member for dispensing feed into the trough, said guide member being yieldably and resiliently mounted for inward movement relative to the trough when contacted by the forwardly moving animal.

3. A device as defined in claim 1 wherein the trough and guide means are structurally interconnected and are detachable from the cage, said device further including a removable door for closing off the open end of the cage when said cage is detached.

4. A device for training a plurality of animals to feed from a common trough comprising, in combination, a plurality of cages as defined in claim 3 in adjacent array.

5. A device as defined in claim 1 in which the lid is pivoted to the cage for raising at an end opposite the trough, and in which the cage has a plurality of pivot openings adjacent the open end and a plurality of corresponding fixing means for securing the lid at the closed end for adjustably positioning the lid to vary the internal height of the cage.